Figure 1:
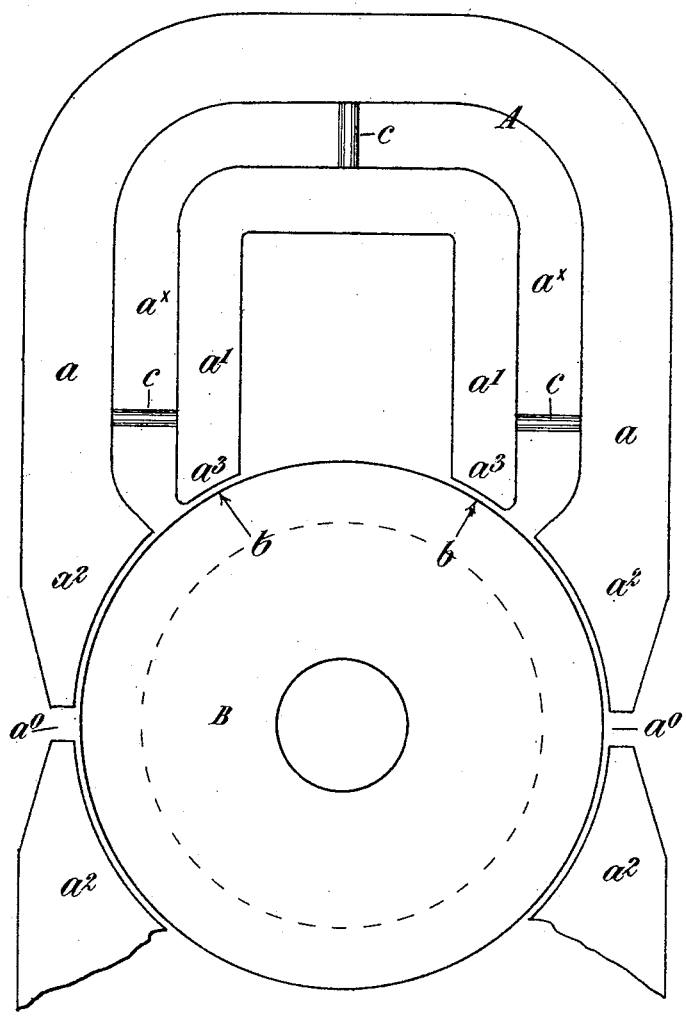

No. 613,116. Patented Oct. 25, 1898.
S. G. BROWN.
DYNAMO ELECTRIC MACHINE OR MOTOR.
(Application filed Apr. 9, 1898.)

(No Model.) 2 Sheets—Sheet 1.

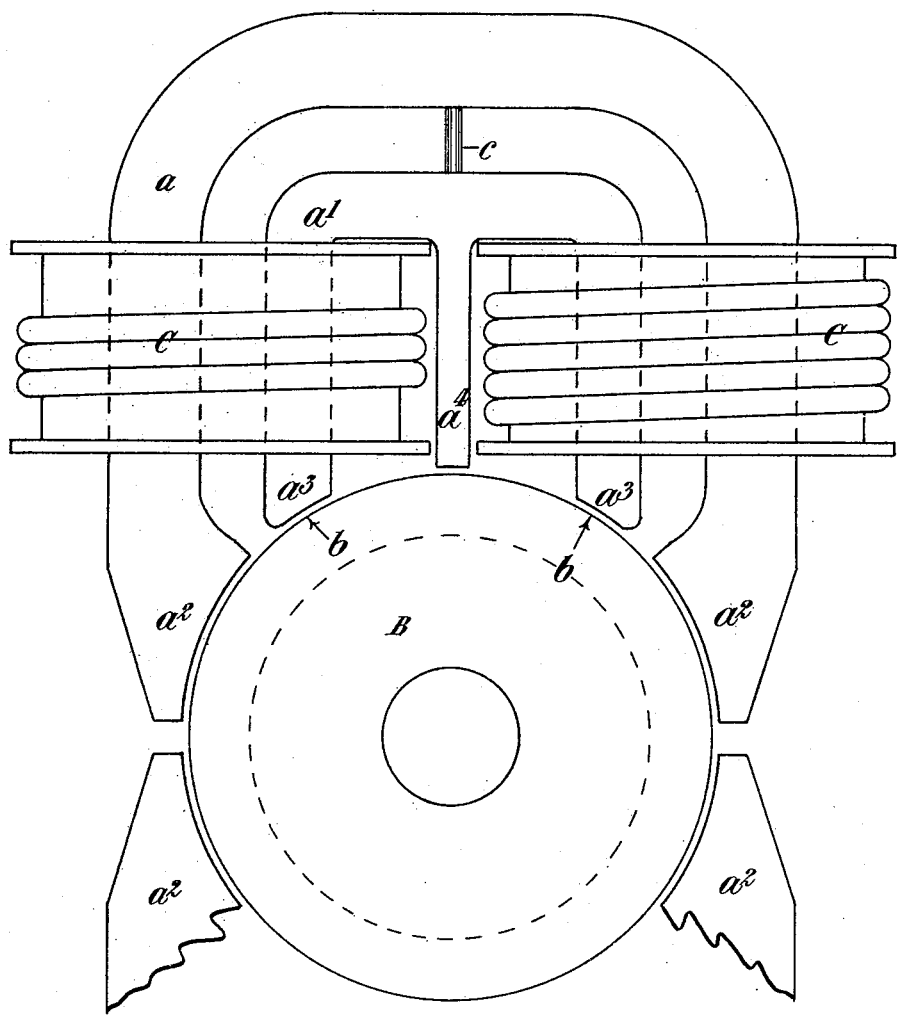

UNITED STATES PATENT OFFICE.

SIDNEY GEORGE BROWN, OF LONDON, ENGLAND.

DYNAMO-ELECTRIC MACHINE OR MOTOR.

SPECIFICATION forming part of Letters Patent No. 613,116, dated October 25, 1898.

Application filed April 9, 1898. Serial No. 677,052. (No model.)

*To all whom it may concern:*

Be it known that I, SIDNEY GEORGE BROWN, electrical engineer, a subject of the Queen of Great Britain, residing at 1 St. John's road, Chelmsford, London, in the county of Essex, England, have invented certain new and useful Improvements in Dynamo-Electric Machines or Motors, of which the following is a specification.

This invention relates to improvements in dynamo-electric machines and motors having a short air-space or clearance and slot or tunnel wound armatures, the object being to overcome the tendency to sparking at the commutators which usually exists with machines of this class, due to distortion of the magnetic field by the armature reaction, and thereby to enable machines to be constructed of much greater capacity relatively to their size than ordinary machines of this kind.

Attempts have been made to overcome the difficulty above referred to by providing auxiliary pole-pieces projecting in advance of one of the main pole-pieces, in combination with a special winding of the coils on the armature, the commutation being effected as the coils are traveling between the main and the auxiliary pole-pieces.

Now according to my invention I obtain the non-sparking action wholly by a modification in the construction of the field-magnets, and am thus enabled to dispense with any special winding of the armature, which latter may be provided with the ordinary diametrical winding usual with drum or ring armature. To this end I form the field-magnet or each field-magnet of two or more portions which magnetically are entirely separate and distinct from one another. If two portions be employed, one may be arranged inside the other, being separated by a wide division-space to prevent as far as possible any magnetic flux or leakage from one portion to the other. The cross-section of the inner portion $a'$ of the magnet need be no greater than is sufficient to carry the field for commutation and the flux to compensate for leakage. The adjacent extremities of the two portions of my improved field-magnet form the pole-pieces, one pair forming one pole and the other pair forming the opposite pole, the two poles thus being symmetrical and each consisting of two portions separated from each other by a relatively large space or gap. My improved field-magnet may be excited by coils wound around the adjacent limbs of each portion thereof, and the exciting-coils may be shunt, series, or compound wound, as desired. By this means when the machine is at work the two portions of each pole-piece, although energized by a common exciting-coil, have different magnetic potentials, which vary according to the load on the machine. Moreover, in some cases in addition to the ordinary exciting-coils independent regulating-coils may be applied to one or other portion of the magnet, preferably the outer portion, to regulate or control its strength relatively to that of the other portion.

In order that my invention may be clearly understood and readily carried into effect, I will proceed to describe the same fully by aid of the accompanying drawings, in which—

Figure 1 is a side view of so much of a dynamo as is necessary to explain my invention, and Fig. 2 is a corresponding view of a modification in which a small intermediate pole-piece is employed.

The constructions shown in the figures are of the kind referred to as having a double magnetic circuit—that is to say, having two magnets of the horseshoe type—one above and the other below the armature. It will be understood, however, that the invention can also be applied to multipolar designs as well as the bipolar.

A are the field-magnets.

B is the armature, which preferably has its windings in slots or tunnels.

C are the exciting-coils, which may be arranged in any suitable manner.

Referring now more particularly to Fig. 1, each of the magnets A is formed in the manner described of outer and inner portions $a$ $a'$ of horseshoe shape, the outer portion $a$ of the magnet being preferably larger in sectional area than the inner portion $a'$, and its pole-piece $a^2$ being also larger than the corresponding pole-piece $a^3$ of the inner portion of the magnet. Care is to be taken that the number of ampere-turns on the segment $b$ $b$ of the armature extending between the extremities or poles $a^3$ of the inner portion of the magnet is less than the effective ampere-turns in the exciting-coils of the corresponding field-magnet.

$a^\times$ is the broad air-space between the inner and outer parts of the magnet.

$a^0$ $a^0$ are air-gaps which are left between the tips of the adjacent pole-pieces of the upper and lower field-magnets.

$c$ $c$ are blocks or fillets of brass or other suitable non-magnetic material whereby the inner portions of the magnets may be retained in the outer portions, although in some cases it might be practicable to cast the inner and outer portions of the magnet with connecting webs or pins of iron so thin as not to materially affect the magnetic flux between the said portions.

The commutation is effected between the diametrically opposite poles $a^3$ above and below the armature. For instance, if the machine were running as a dynamo the commutation would take place under the left-hand pole $a^3$, whereas if it were running as a motor the commutation would take place under the right-hand pole.

It will be seen that the magnetic circuit of the poles $a^3$ is practically insulated from that of the poles $a^2$ and that the former poles have a much higher potential and have also much smaller polar spans than the poles $a^2$. Distortion of the commutating-field is thus practically reduced to zero.

The construction above described is suitable for ordinary cases and provides against sparking up to a certain degree of load, which varies with different machines. In machines, however, intended to deal with loads subject to excessive variation—such as met with in tramway-circuits, for instance—and where fixity of brush is required, I prefer, as shown in Fig. 2, to provide a subsidiary intermediate pole-piece $a^4$, fixed to the inner field-magnet and adapted to act upon the portion of the armature between the poles of the field-magnet. This subsidiary pole-piece may be series wound, so that its strength varies according to the variation in the load. In Fig. 2 I have shown this series winding as conveniently placed around both sides of the main magnetic circuit and in such a manner that their sum will act on the pole-piece $a^4$, while their difference only affects the main magnetic circuit. In other respects the arrangement shown in Fig. 2 corresponds with that shown in Fig. 1.

I am aware that in previous attempts in this direction slots or division-spaces have been formed in the body of the field-magnet; but these have only been for the purpose of introducing a slight magnetic reluctance to the cross-turns, whereas the purpose of my wide division-space is to allow the inner portion of the magnet to be as much as possible magnetically isolated from the rest of the circuit, so that at the maximum load on the armature there shall be a sufficient field for commutation.

What I claim is—

1. In a field-magnet for a dynamo or motor, the combination of an outer portion having an extended pole-face an inner portion magnetically distinct from said outer portion and having a contracted pole-face, and means for exciting said two portions, substantially as described.

2. In a field-magnet for a dynamo or motor the combination of an inner portion of horse-shoe shape having contracted pole-faces, and outer portions having extended pole-faces and magnetically independent.

3. In a field-magnet for a dynamo or motor the combination of an inner and an outer portion, separated by a wide air gap or space and an intermediate pole-piece, between the poles of the inner portion, substantially as described.

4. In a field-magnet for a dynamo or motor the employment of an inner portion forming a distinct magnetic circuit from the rest of the magnetic circuit and having a higher magnetic potential than the same, substantially as and for the purposes described.

5. A dynamo or motor having a commutating-field separate from and at a higher potential than the rest of the magnetic field, substantially as described.

6. In a field-magnet for a dynamo or motor the combination of an inner and an outer portion, separated by an air gap or space, an intermediate pole-piece between the poles of the inner portion, and means for exciting the said pole-piece substantially as described.

7. In a dynamo or motor, the combination of a field-magnet formed in two magnetically-distinct portions with a wide air-space between them, and a diametrically-wound armature with its coils wound in slots or tunnels, and an exciting-coil surrounding both portions of said field-magnet substantially as described.

8. In a dynamo or motor the combination of a pair of field-magnets having an air-space between their adjacent ends and each formed in two magnetically-distinct parts, one of said parts having a wider pole-piece than the other, and said parts being separated by an air-space, and an armature having its coils wound in slots or tunnels substantially as described.

9. In a dynamo or motor, the combination of a pair of field-magnets formed in two magnetically-distinct parts an intermediate pole-piece projecting from one of said parts, and an armature having its coils wound in slots or tunnels substantially as described.

10. In a field-magnet for a dynamo or motor, the combination of an outer magnetic portion and an inner magnetic portion said portions being connected by thin non-magnetic webs, rods, or pins of small cross-section, substantially as described.

In testimony whereof I have hereunto set my hand in presence of two subscribing witnesses.

SIDNEY GEORGE BROWN.

Witnesses:
CHAS. B. BURDON,
H. ASHBY NORRIS.